United States Patent [19]
Wakai

[11] Patent Number: 5,700,119
[45] Date of Patent: Dec. 23, 1997

[54] NAIL WITH SPREADABLE LEGS

[75] Inventor: Takao Wakai, Osaka, Japan

[73] Assignee: Wakai & Co., Ltd., Osaka, Japan

[21] Appl. No.: 686,865

[22] Filed: Aug. 1, 1996

[30] Foreign Application Priority Data

Sep. 8, 1995  [JP]  Japan .................... 7-231498

[51] Int. Cl.⁶ .................... F16B 13/04; F16B 15/00
[52] U.S. Cl. .................... 411/78; 411/79; 411/358
[58] Field of Search .................... 411/75, 78, 79, 411/80, 357, 358

[56] References Cited

U.S. PATENT DOCUMENTS

| | | | |
|---|---|---|---|
| 4,886,406 | 12/1989 | Herb | 411/78 |
| 4,892,450 | 1/1990 | Gerhard | 411/78 |
| 5,529,424 | 6/1996 | Neubert et al. | 411/78 X |

FOREIGN PATENT DOCUMENTS 283720  9/1988  European Pat. Off. .................... 411/78

*Primary Examiner*—Neill R. Wilson
*Attorney, Agent, or Firm*—Wenderoth, Lind & Ponack

[57]    ABSTRACT

A nail with spreadable legs has legs that can be spread apart by a constant angle irrespective of the hardness of the ALC material into which the nail is driven. The nail has two leg members bound together by a washer with their flat sides abutting each other. One of the leg members has a protrusion on its respective flat surface near its tip. A projection and a recess are formed on the flat surfaces of the respective leg members. With the leg members bound by the washer, the projection engages in the recess near the washer. When the nail is driven in to a predetermined depth, the projection disengages from the recess, so that the legs begin to spread apart. It is thus possible to control the spread angle of the leg members.

20 Claims, 4 Drawing Sheets

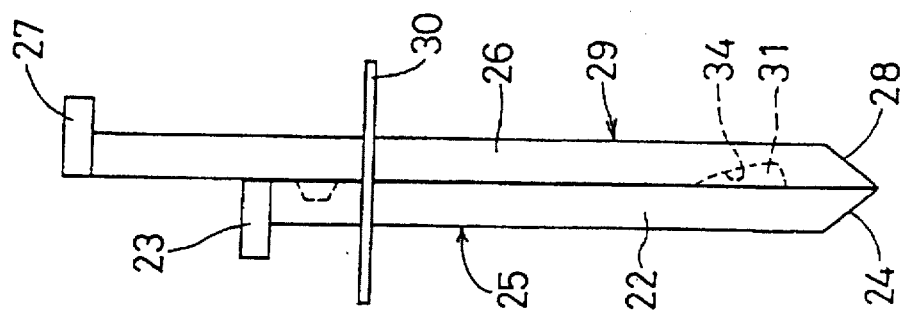
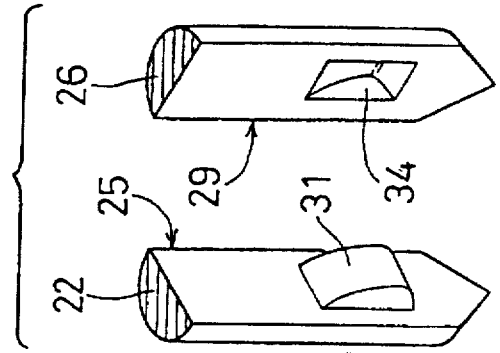
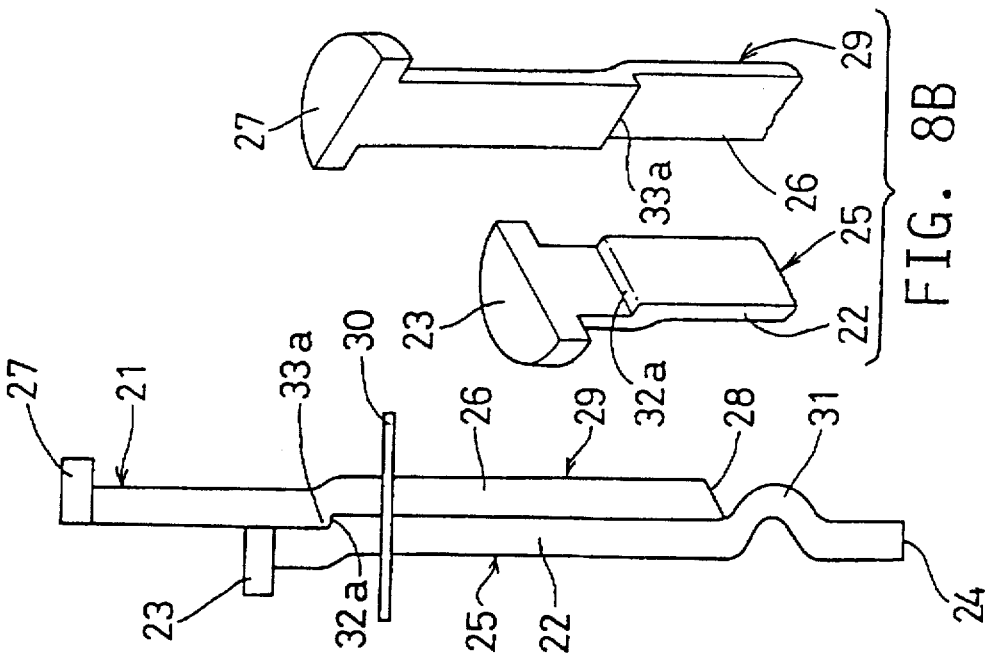

NAIL WITH SPREADABLE LEGS

BACKGROUND OF THE INVENTION

This invention relates to a nail with spreadable legs used to directly mount a member which can be easily broken under an excessive load, such as thin slate, to an ALC (aerated concrete) member.

Anchors and nails which show high resistance to pulling force have been used to fix various members to ALC.

FIGS. 9A to 9F show such conventional nails and anchors. The nail shown in FIG. 9A is a tapered nail 2 with legs 1 having a square section and tapering toward the tips. As it is driven deeper into ALC 3, its resistance to pulling force increases due to compressive force.

FIG. 9B and 9C show a nail with spreadable legs 5. As the nail is driven into the ALC, the legs 5 are spread gradually, so that the resistance to pulling force increases gradually. In order to spread the legs 5, a bendable wedge member 6 is disposed between the legs 5. As the ALC is compressed, the resistance to pulling force increases.

FIGS. 9D and 9E show a nail having a long and a short leg 7, 8 which are bound together by a washer 9. The nail is driven into the ALC 3 by striking the head 10 of the short leg 8 until the latter is completely buried in ALC (FIG. 9D). Then, by driving the long leg 7 completely into the ALC 3, their tips are automatically spread apart, so that the resistance to pulling force increases.

FIG. 9F shows an anchor 11 having a tubular member 13 formed with female threads 12 on its inner periphery and slits 14 at its tip. As the tubular member 13 is driven into the ALC, a wedge member 15 mounted at its tip spreads the portions defined between the slits 14, so that the resistance to pulling force increases.

The tapered nail shown in FIG. 9A can be driven in easily without the possibility of damaging the member to be fixed to the ALC. Immediately after the nail has been driven in, the resistance to pulling force is high. But if it loosens due to an external force thereafter, it tends to lose resistance to a pulling force.

The nail with spreadable legs shown in FIGS. 9B and 9C can be easily driven in, as with the tapered nail shown in FIG. 9A. Moreover, once it is driven in, it maintains a high resistance to pulling a force even if it loosens. But this nail has a problem in that the spread angle of the legs tends to vary depending upon the hardness of the ALC and other factors. For example, if the ALC is too hard, the wedge member may penetrate deep in between the legs, causing excessive spreading of the legs, as shown in FIG. 9B. Since the spread angle of the legs is not constant, the resistance to pulling force is also not constant.

The nail shown in FIGS. 9D and 9E has the advantages of the nails shown in FIG. 9A and 9B-9C. That is, it shows a high resistance to pulling a force, and will not slip out easily even if it loosens. The legs automatically spread apart when the nail is driven into the ALC with the head of the shorter leg in abutment with the member to be fastened to the ALC. Thus, the spread angle of the legs is constant irrespective of the hardness of the ALC. But this nail has a problem in that when the head of the longer leg is struck with a hammer with the head of the shorter leg in abutment with the member to be fixed to spread the legs, the head of the shorter leg hits hard against the member to be fastened, so that the member is likely to be broken, especially if it is made of a brittle material.

The anchor shown in FIG. 9F requires many manufacturing steps and thus is costly. It has to be driven in with a strong force because it has to be completely buried in the ALC. Such an anchor is actually not suitable as a fastening means for fastening something to ALC.

SUMMARY OF THE INVENTION

An object of this invention is to provide a nail with spreadable legs which is less likely to slip out even if it loosens, whose legs can be spread apart at a constant angle irrespective of the hardness of ALC, and which never damages a member to be fastened.

According to this invention, there is provided a nail with spreadable legs comprising two leg members made of wire each having a section, having a flat surface on the outer periphery thereof. Each leg member having a head at one end thereof and a tip at the other end, and a washer is mounted on the leg members to bind the leg members together with their flat surfaces abutting each other. One of the leg members has a protrusion formed on the flat surface thereof at a portion near the tip thereof and protruding toward the other of the leg members. One of the two leg members is formed with a recess, and the other of the leg members is formed with a projection adapted to be engage in the recess, on their respective flat surfaces abutted with each other. The recess and the projection are positioned so that the flat surface of the other of the leg members near its tip is not in contact with the protrusion, and the head of the other of the leg members is located above the head of the one of the leg members, with the washer located adjacent to the recess and the projection when the projection is engaged in the recess.

BRIEF DESCRIPTION OF THE DRAWINGS

Other features and objects of the present invention will become apparent from the following description made with reference to the accompanying drawings, in which:

FIG. 6 is a front view of a third embodiment;

FIG. 7 is an exploded perspective view of a protrusion;

FIG. 8A is a front view of a fourth embodiment;

FIG. 8B is an exploded perspective view of the leg spread angle control portion of the same;

DETAILED DESCRIPTION OF THE PREFERRED EMBODIMENT

Figure 1:
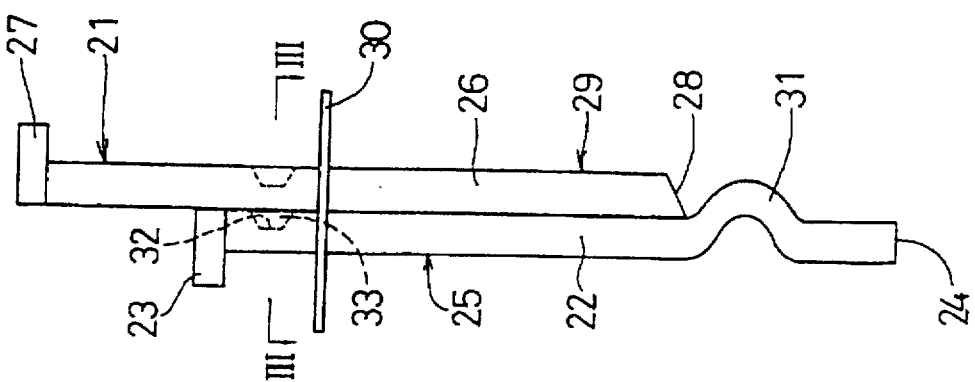
FIG. 1 is a front view of a first embodiment of the nail with spreadable legs according to this invention.

The embodiments of this invention are described with reference to the drawings.

In the first embodiment shown in FIGS. 1–4, the nail 21 comprises a first leg member 25, a second leg member 29 and a washer 30. The first leg member 25 has a leg 22 formed of a wire having a semicircular cross-section with a flat surface and having a tip 24 at one end, and a head 23 provided at the other end of the leg 22 and protruding from the arcuate side of the leg 22.

The second leg member 29 has a leg 26 formed of a wire having a semicircular cross-section with a flat surface and having a tip 28 at one end, and a head 27 similar to the head 23. The leg members 25 and 29 are bound together by the washer 30 with their flat surfaces butting each other. In the embodiment shown, the leg members 25 and 29 are substantially the same length. But their lengths relative to each other may be varied according to the desired spread angle of the legs.

The leg 22 of the first leg member 25 has a protrusion 31 provided on its flat surface at a portion near the tip 24 and protruding toward the second leg member 29. The protrusion 31 is formed e.g. by pressing. The protrusion of the embodiment is formed into a substantially semicircular shape. But it may have a V-shaped or trapezoidal section. Since the protrusion 31 is formed by bending the leg 22, it possesses resilience.

The leg members 25 and 29 are bound together by the washer 30 with the tip 28 of the second leg member 29 located immediately over the protrusion 31 (FIG. 1). One of a truncated conical recess 32 and a projection 33 complementary in shape to the recess 32 is formed on the flat surface of the first leg member 25 immediately under the head 23. The other of the recess 32 and the projection 33 is formed on the flat surface of the second leg member 29 so as to be in engagement with the recess 32 or the projection 33 of the first leg member 25. This portion is hereinafter called the spread angle control portion.

As shown in FIG. 1, when the projection 33 is received in the recess 32, the tip 28 of the second leg member 29 is immediately over the protrusion 31, with the head 27 of the second leg member 29 located above the head 23 of the first leg member 25 and the washer 30 immediately below the recesses 32 and the projection 33.

Specifically, when the projection 33 is received in the recess 32, they are located near the head 23 of the first leg member 25, while the washer 30 is located slightly under the recess 32 and the projection 33 and nearer to the tip of the nail. The recess 32 or the projection 33 of the first leg member 25 is spaced slightly from the head 23 of the first leg member 25 so that a plurality of washers can be fitted therebetween.

The leg members 25 and 29 may have a polygonal cross-section instead of a semicircular cross-section. Their tips may be tapered, pointed, rounded or flattened. In the embodiment, their heads 23 and 27 are both substantially semicircular plate members. But the head 27 of the second leg member 29 may be rod-shaped.

Figure 5:
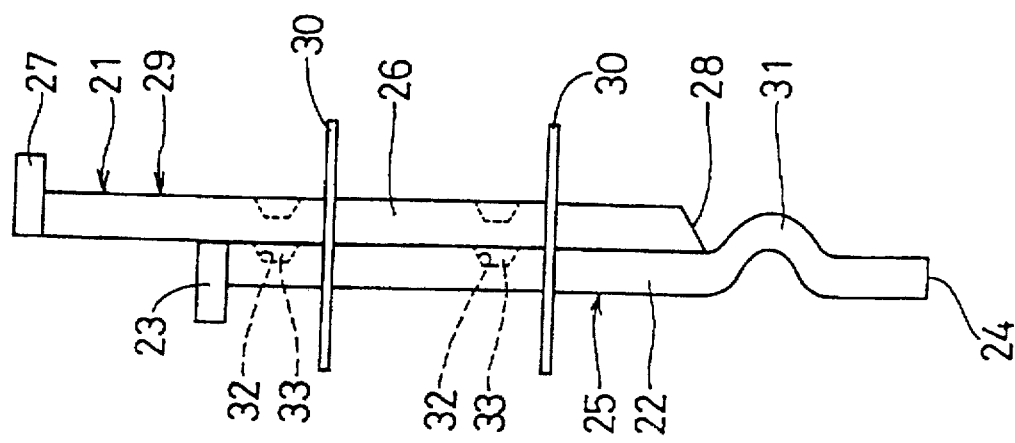
FIG. 5 is a front view of a second embodiment.
Figure 9A:
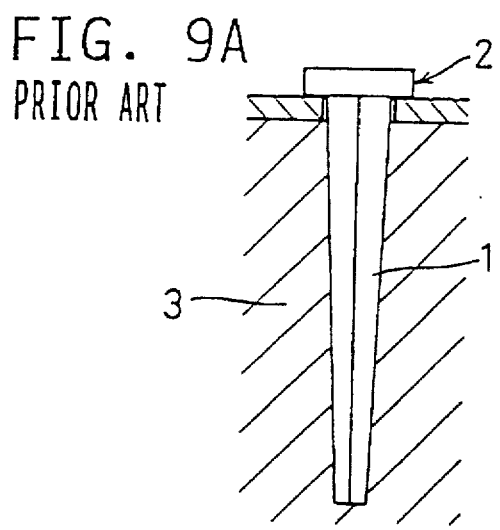
FIG. 9A is a vertical sectional view of a conventional tapered nail.
Figure 9B:
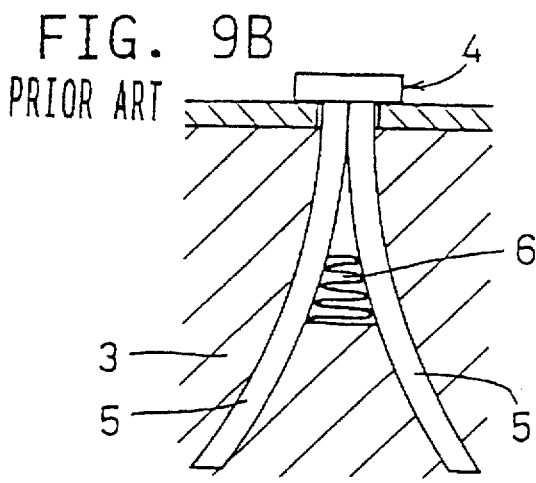
FIGS. 9B and 9C are vertical sectional views of another conventional nail with spreadable legs.
Figure 9C:
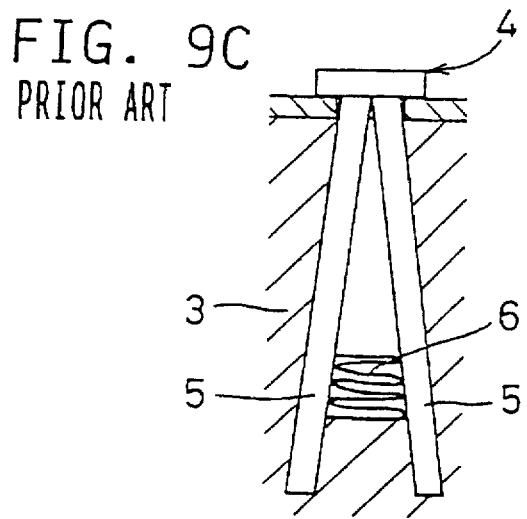
Figure 9D:
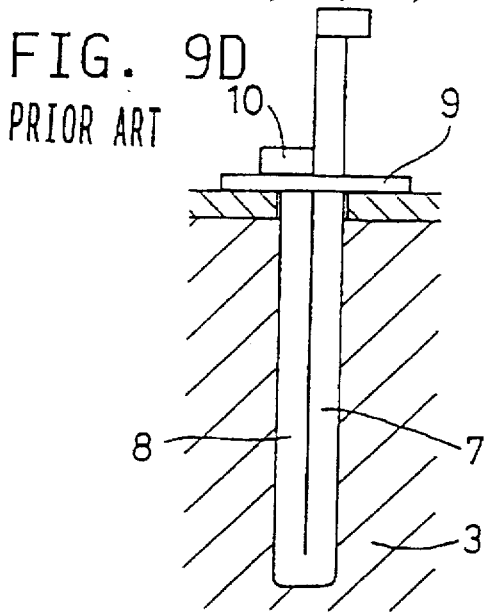
FIGS. 9D and 9E are vertical sectional views of a further conventional nail with spreadable legs connected together.
Figure 9E:
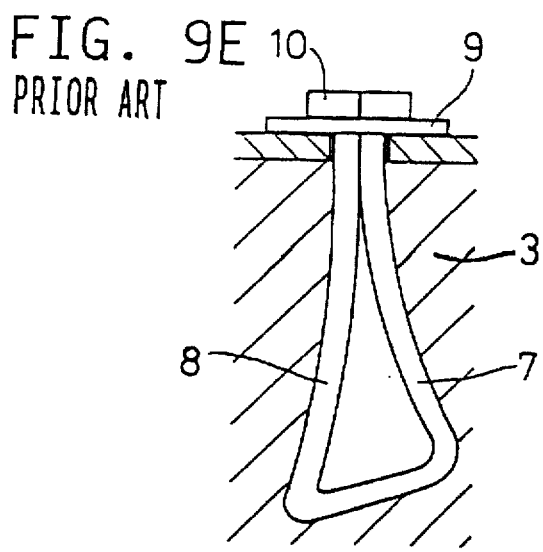
Figure 9F:
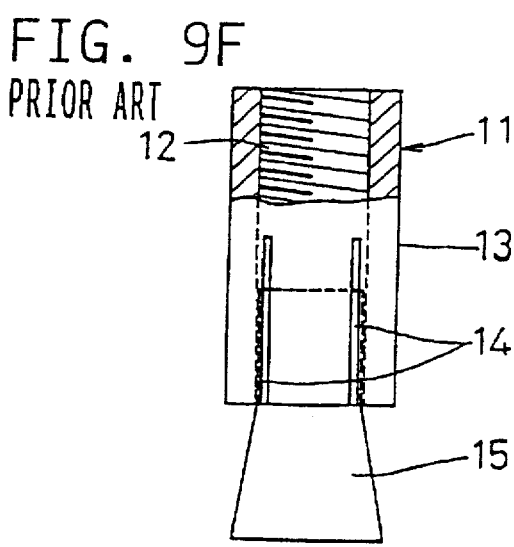
FIG. 9F is a partially cutaway front view of a conventional anchor.

In the second embodiment shown in FIG. 5, the leg members 25 and 29 are provided with a plurality of recesses 32 and projections 33 at different levels. A plurality of washers 30 may be used, too. If a single washer 30 is used, it should be provided immediately under the recess and the projection at the highest level.

In the third embodiment shown in FIGS. 6 and 7, the protrusion 31 is a bump formed by pressing on the center of the flat surface of the first leg member 25. The second leg member 29 is longer than the first leg member 25 and is formed with a recess 34 in which the protrusion 31 is received when the flat surfaces of the leg members 25 and 29 are abutted with to each other with their tips coincident.

In the fourth embodiment shown in FIGS. 8, instead of the recess 32 and the projection 33 of the first embodiment, the first leg member 25 is provided with a shoulder 32a immediately under its head 23, while the second leg member 29 is provided with a shoulder 33a complementary to and adapted to be supported on the shoulder 32a.

We will now explain how the nail of the first embodiment shown in FIGS. 1–4 is used. The nails of the other embodiments are used in substantially the same way as the nail of the first embodiment.

The nail 21 assembled as shown in FIG. 1 is driven into ALC 37 through a hole 35 of a member 36 to be fastened to the ALC, such as a slate member with a hammer. The first leg member 25 and the second leg member 29 are driven into the ALC 37 keeping their initial position. i.e. without spreading apart, until the washer 30 abuts the member 36.

In other words, until the washer 30 abuts the member 36, the first leg member 25 and the second leg member 29, bound together by the washer 30, remain coupled together with the projection 33 engaged in the recess 32 in spite of the fact that they are driven into the ALC 37 by striking only the head 27 of the second leg member 29.

Once the washer 30 abuts the member 36, only the leg members 25 and 29 are driven into the ALC, with the washer 30 at a stop. That is, the washer 30 moves, relative to the leg members 25 and 29, toward the head 23 of the first leg member 25. The nail is driven in until the washer 30 passes the recess 32 and the projection 33, and abuts the head 23 of the first leg member 25.

Figure 2:
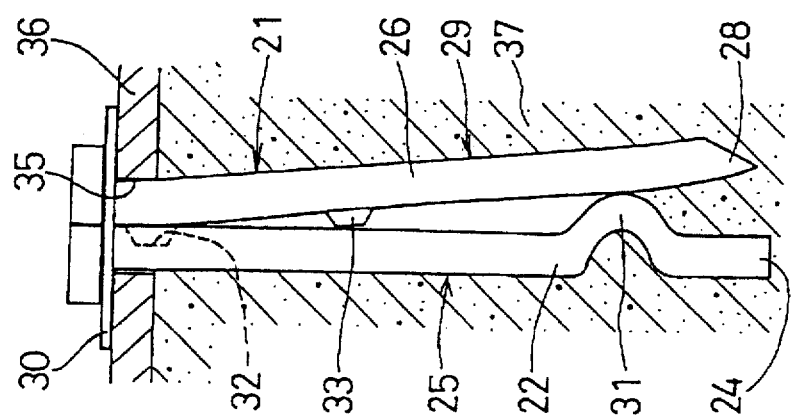
FIG. 2 is a vertical sectional view of the same showing the state when it is driven into ALC.
Figure 3:
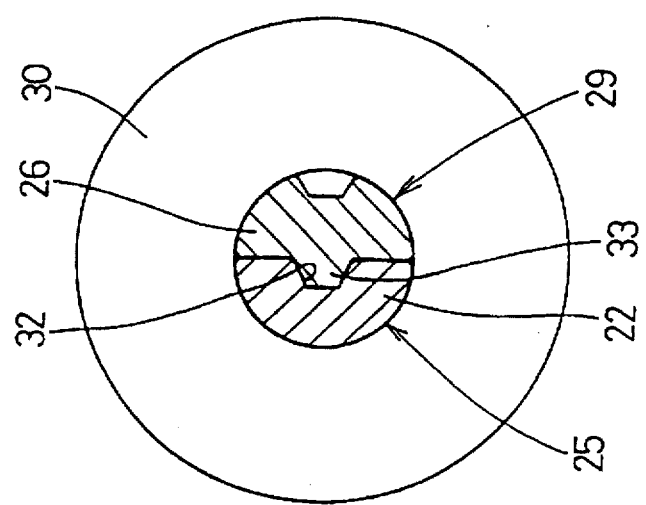
FIG. 3 is an enlarged cross-sectional view taken along line III—III of FIG. 1.
Figure 4:
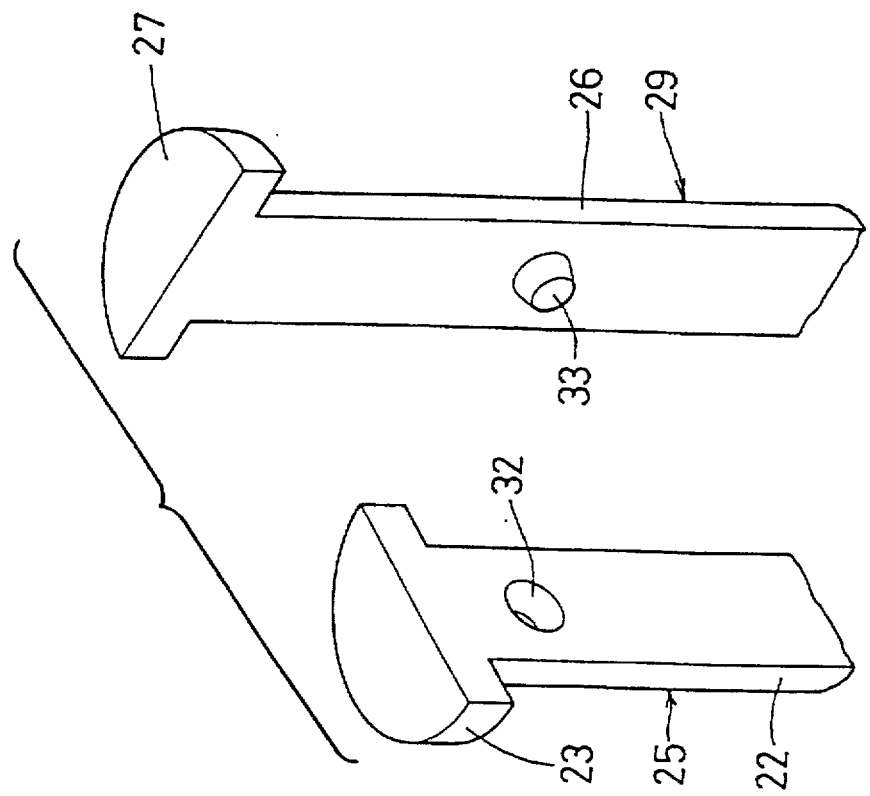
FIG. 4 is an exploded perspective view of the heads of the same.

In this state, the projection 33 is separable from the recess 32. Thus, by further driving in the second leg member 29 with a hammer, it will smoothly proceed through the ALC 37 while sliding over the protrusion 31 of the now stationary first leg member 25. The second leg member 29 thus gradually spreads away from the first leg member 25 as shown in FIG. 2 until its head 27 abuts the washer 30.

While the nail according to this invention is driven into the ALC 37, the washer 30 keeps the projection 33 engaged in the recess 32 until it abuts the head 23 of the first leg member 25. Once the washer 30 abuts the head 23, the second leg member 29 begins to separate from the first leg member. Thus, the spread angle of the legs is, always kept constant irrespective of the hardness of ALC, the so that no undue load will act on the member to be fastened to ALC.

Advantages of this invention are listed below.

(I) Since the legs are spreadable, the nail of the present invention shows a high resistance to pulling force and is vibration-proof. Its resistance to pulling force is maintained even if it is pulled back several millimeters.

(II) By driving in the nail, the washer moves relative to the nail, allowing the projection to be disengaged from the recess, so that the legs can always spread apart by a constant angle irrespective of the hardness of the ALC. Since the spread angle of the legs is constant, the nail shows a constant resistance to pulling force.

(III) The time at which the legs begin spreading apart is controlled by the control means comprising the recess, the projection and the washer. This makes it possible to control the pressure on a member to be fastened from the head of the nail to a low level, so that it is possible to fasten even a brittle member such as a thin slate member to the ALC without damaging it.

What is claimed is:

1. A nail comprising:

two leg members made of wire, each of said two leg members having a section having a flat surface on an outer periphery thereof, and each of said two leg members having a head at one end thereof and a tip at the other end thereof; and a washer adapted to be mounted on said leg members to bind said leg members together with said flat surfaces of said two leg members abutting each other;

wherein a first of said two leg members comprises a protrusion that protrudes from said flat surface of the first of said two leg members toward the second of said two leg members at a position adjacent said tip of the first of said two leg members;

wherein one of said two leg members comprises a recess formed in said flat surface thereof and an other of said two leg members comprises a projection formed in said flat surface thereof, said projection being adapted to be engaged in said recess with the respective said flat surfaces thereof abutted against each other;

wherein said recess and said projection are positioned such that when said projection is engaged with said recess, said flat surface of the second of said two leg members adjacent said tip of the second of said two leg members is positioned out of contact with said protrusion and said head of the second of said two leg members is positioned further away from said recess and said projection than said head of the first of said two leg members.

2. The nail of claim 1, wherein said protrusion of the first of said two leg members comprises a bend in the first of said two leg members.

3. The nail of claim 2, wherein said recess comprises a first shoulder portion below said head of the one of said two leg members and said projection comprises a second shoulder portion on the other of said two leg members adapted to fit on said first shoulder portion.

4. The nail of claim 1, wherein said protrusion comprises a bump formed on the center of said flat surface of the first of said leg members by pressing.

5. The nail of claim 4, wherein said recess comprises a first shoulder portion below said head of the one of said two leg members and said projection comprises a second shoulder portion on the other of said two leg members adapted to fit on said first shoulder portion.

6. The nail of claim 1, wherein the second of said two leg members comprises a depression in said flat surface thereof such that when said projection is engaged with said recess, said tip of the second of said two leg members is located closer to said tip of the first of said two leg members than said protrusion and said protrusion is engaged with said depression.

7. The nail of claim 6, wherein said recess comprises a first shoulder portion below said head of the one of said two leg members and said projection comprises a second shoulder portion on the other of said two leg members adapted to fit on said first shoulder portion.

8. The nail of claim 1, wherein said recess comprises a first shoulder portion below said head of the one of said two leg members and said projection comprises a second shoulder portion on the other of said two leg members adapted to fit on said first shoulder portion.

9. The nail of claim 1, and further comprising a second recess and a second projection formed in said flat surfaces of said two leg members and positioned to be engaged with each other when the first said recess and the first said projection are engaged with each other.

10. The nail of claim 9, and further comprising a second washer adapted to be mounted on said leg members to bind said leg members together with said flat surfaces of said two leg members abutting each other.

11. A nail comprising:

two leg members made of wire, each of said two leg members having a section having a flat surface on an outer periphery thereof, and each of said two leg members having a head at one end thereof and a tip at the other end thereof; and a washer mounted on said leg members to bind said leg members together with said flat surfaces of said two leg members abutting each other;

wherein a first of said two leg members comprises a protrusion that protrudes from said flat surface of the first of said two leg members toward the second of said two leg members at a position adjacent said tip of the first of said two leg members;

wherein one of said two leg members comprises a recess formed in said flat surface thereof and an other of said two leg members comprises a projection formed in said flat surface thereof, said projection being engaged in said recess with the respective said flat surfaces thereof abutted against each other, said washer being positioned adjacent to said recess and said projection;

wherein said recess and said projection are positioned such that said flat surface of the second of said two leg members adjacent said tip of the second of said two leg members is positioned out of contact with said protrusion and said head of the second of said two leg members is positioned further away from said recess and said projection than said head of the first of said two leg members.

12. The nail of claim 11, wherein said protrusion of the first of said two leg members comprises a bend in the first of said two leg members.

13. The nail of claim 12, wherein said recess comprises a first shoulder portion below said head of the one of said two leg members and said projection comprises a second shoulder portion on the other of said two leg members engaged with said first shoulder portion.

14. The nail of claim 11, wherein said protrusion comprises a bump formed on the center of said flat surface of the first of said leg members by pressing.

15. The nail of claim 14, wherein said recess comprises a first shoulder portion below said head of the one of said two leg members and said projection comprises a second shoulder portion on the other of said two leg members engaged with said first shoulder portion.

16. The nail of claim 11, wherein the second of said two leg members comprises a depression in said flat surface thereof such that said tip of the second of said two leg members is located closer to said tip of the first of said two leg members than said protrusion and said protrusion is engaged with said depression.

17. The nail of claim 16, wherein said recess comprises a first shoulder portion below said head of the one of said two leg members and said projection comprises a second shoulder portion on the other of said two leg members engaged with said first shoulder portion.

18. The nail of claim 11, wherein said recess comprises a first shoulder portion below said head of the one of said two leg members and said projection comprises a second shoulder portion on the other of said two leg members engaged with said first shoulder portion.

19. The nail of claim 11, and further comprising a second recess and a second projection formed in said flat surfaces of said two leg members engaged with each other.

20. The nail of claim 19, and further comprising a second washer mounted on said leg members to bind said leg members together with said flat surfaces of said two leg members abutting each other, said second washer being positioned adjacent to said second recess and said second projection.

* * * * *